June 18, 1963
T. L. THOMAS
3,094,569
ADSORPTIVE SEPARATION PROCESS
Filed Oct. 20, 1958
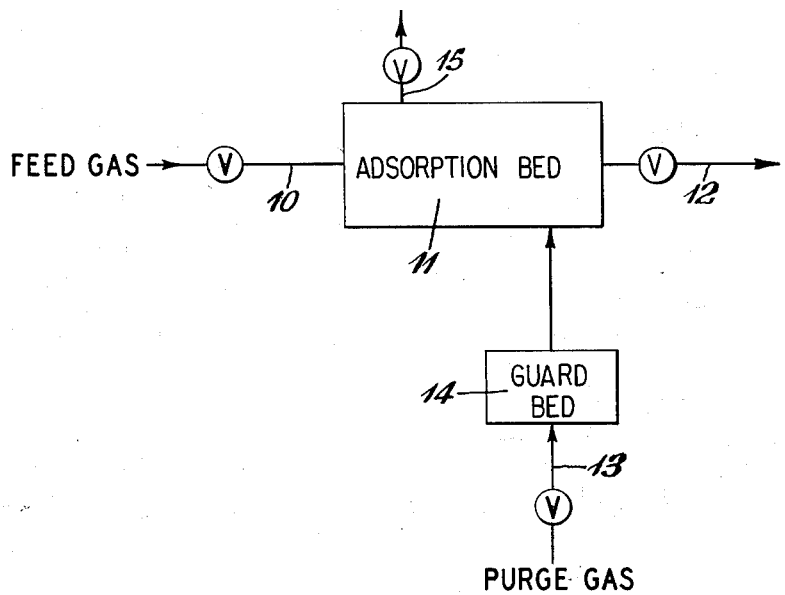
INVENTOR.
TUDOR L. THOMAS
BY John C. LeFever
ATTORNEY

United States Patent Office 3,094,569
Patented June 18, 1963

3,094,569
ADSORPTIVE SEPARATION PROCESS
Tudor L. Thomas, Snyder, N.Y., assignor to Union Carbide Corporation, a corporation of New York
Filed Oct. 20, 1958, Ser. No. 768,092
9 Claims. (Cl. 260—677)

This invention relates to a method for separating mixtures by a molecular sieve. More particularly, this invention relates to a method of separating gaseous or vaporized mixtures by a molecular sieve capable of selectively adsorbing at least one of the components of such mixtures.

In many adsorption applications, contaminants are frequently found in the adsorption and desorption or purge streams influent to the system. These contaminants, if not first removed, are deposited on the adsorption bed where they may polymerize, crack and otherwise reduce the efficiency of the adsorbent. Periodic treatment then becomes necessary to return the adsorbent to useful service.

It has often been found useful to install "guard traps" which remove these contaminants from the influent streams prior to their contacting the adsorption bed. these guard traps may contain any material which will remove these contaminants by adsorption, absorption, reaction, etc.

These traps have been successfully used to purify such streams as air gases, ethane, butane, natural gas, butene-1 and "sour" mixtures of $C_1$ through $C_4$, normal and iso-paraffins and olefins.

It is an object of this invention to provide an improved molecular sieve adsorption process.

It is a further object of this invention to provide a method for removing materials which interfere with adsorption in a molecular sieve adsorption process.

According to the present invention a hydrocarbon mixture is separated into its components by passing it over a preliminary adsorbent and then over a molecular sieve. Components of the mixture which would interfere with adsorption by the molecular sieve are removed by the preliminary adsorbent.

Undesirable constituents may be removed from the mixture to be separated by passing the mixture over a guard bed before contact with the molecular sieve adsorbent is made. The guard bed is composed of any material which will effectively remove the interfering constituent. For example, activated alumina may be used to remove carbonaceous materials and sulfur, oxygen and nitrogen-containing materials which otherwise clog the molecular sieve pores and interfere with effective adsorption and desorption. As another example, activated carbon may be used to remove sulfurous materials and heavy carboneous compounds from the mixture before passing it over the sieve. Highly polar substances such as hydrogen sulfide, carbon dioxide, water and the like may be removed by using silica gel or a molecular sieve type zeolite adsorbent having adsorption characteristics which are different from those of the main molecular sieve adsorbent bed which is being guarded.

Any selective adsorbent can be employed in this invention. However, solid adsorbents of the molecular sieve type, particularly the alumino-silicate molecular sieves, are particularly adaptable to the method of this invention. Sodium-calcium alumino-silicate, designated type 5A molecular sieve, is an example of a molecular sieve to which the method applies. The structure of such synthetic zeolites is discussed in the "Journal of the American Chemical Society," vol. 78, at page 2388, pages 5963 to 5971 and pages 5972 to 5977. Zeolite A is described in U.S. Patent No. 2,882,243 and British Patent No. 777,232, the latter having been published June 19, 1957.

Guard bed protection is also valuable where recovery of low molecular weight olefins such as ethylene from natural gas or debutanized refinery gas streams is desired. Examples of molecular sieve zeolites which may be used are analcite ($Ca^{++}$ or $Ba^{++}$ form), described in U.S. Patent 2,413,134; gmelinite, described in U.S. Patent 2,306,610; chabazite, described in U.S. Patent 2,306,610 and Zeolite type 4A.

Guard bed protection can also be used during the separation of normal paraffins and olefins from branched chain and cyclic hydrocarbons. Erionite and calcium or other divalent cation-exchanged forms of Zeolite type A molecular sieve are of value for this purpose.

Example I

As an example of the invention, an adsorption column of an alumino-silicate molecular sieve 2 inches in diameter by 36 inches long was set up for adsorption purposes. The sieve was in the form of $\frac{1}{16}$ inch pellets.

Crude kerosene containing 0.09%±0.02% by weight total sulfur was passed through the molecular sieve column and it was found that following one passage the total sulfur was 0.11%±0.02% by weight.

The same initial kerosene was then passed through 14 x 20 mesh activated carbon and was then found to have 0.04±0.02 weight-percent total sulfur. Following this, the kerosene was passed through the molecular sieve column again and the final sulfur content was 0.05±0.02 weight-percent.

This example indicates that it is often advantageous to utilize a preliminary adsorbent to remove undesirable components before attempting to separate some mixtures. The sulfur would deleteriously affect the adsorptive ability of the molecular sieve and its removal enables the sieve to maintain its adsorptive capacity over a large number of adsorption-desorption cycles.

Example II

An automatic cycling unit designed for a study of olefin recovery with molecular sieve type 5A was placed in operation and is illustrated schematically in the single FIGURE. During adsorption, a mixture of 32 volume-percent propylene in nitrogen was passed through conduit 10 to the bed 11 of molecular sieve type 5A. Breakthrough capacity for propylene was determined with a thermal-conductivity cell and the propylene-depleted product gas was discharged from bed 11 through conduit 12. Desorption was accomplished by purging the bed 11 with methane introduced through conduit 13 at 300° C. and dicharged through conduit 15. After 72 such cycles, there was no detectable decrease in propylene capacity.

Butane was then substituted for methane (cycle No. 73) as the desorption purge gas and cycling was continued. The capacity for propylene decreased from 9.3 weight-percent (cycle No. 72) to 7.0 weight-percent (cycle No. 97). Since the butane contained mercaptans and some water, it was believed that these trace impurities were building up on the adsorption bed and subsequently reducing capacity.

Upon completion of 104 cycles, a guard trap 14 containing molecular sieve type 13X was installed in the butane line 13 to effect the removal of mercaptans and water. The propylene capacity slowly increased from 6.3 weight-percent on cycle 123 to 7.3 weight-percent on cycle 293 and then remained constant until the unit was shut down on cycle 368. Zeolite X is described in U.S. Patent No. 2,882,244 and British Patent No. 777,233, the latter having been published June 19, 1957.

The guard trap had obviously removed the contaminants from the butane purge gas. This purified gas slowly cleared the "fouled" adsorption bed.

Example III

In the evaluation of molecular sieve type 5A for the removal of hydrogen sulfide from natural gas, an automatic cycling unit was utilized. During adsorption, a mixture of 10 volume-percent hydrogen sulfide in laboratory gas (natural plus manufactured) was passed through the adsorption bed. Desorption was accomplished by purging the bed with laboratory gas at 525° F.

Chromatographic analysis of the laboratory gas stream revealed the presence of 0.9 volume-percent ethylene. Since this gas was to be used during both adsorption and desorption in a study of hydrogen sulfide removal, it was advisable to remove the ethylene from the laboratory gas stream. It was found that molecular sieve type 5A effectively removed the ethylene from laboratory gas with a 3 weight-percent loading at breakthrough.

A guard trap of molecular sieve type 5A was installed in the laboratory gas line to remove the ethylene from the gas used during adsorption and desorption cycles.

Example IV

A 50-50 weight mixture sieve type X and Ascarite (asbestos coated with sodium hydroxide) was employed as a guard bed on an automatic cycling adsorbent unit in a study of the recovery of olefins from a hydrocarbon stream. During adsorption, a stream of debutanized refinery gas ($C_1$ through $C_3$ normal paraffins and olefins) was passed through a bed of molecular sieve type 5A. Desorption was accomplished using a purge of ethane at 300° C. The ethane purge gas was purified of trace contaminants containing sulfur compounds and water by treatment in a guard trap containing a mixture of Ascarite and type X molecular sieve. This mixture is particularly effective where acid gases such as carbon dioxide, hydrogen-sulfide and the like are to be removed because the Ascarite (containing sodium hydroxide) takes up the acid gas by chemical reaction and the water which is released is adsorbed by the molecular sieve adsorbent. The large pore size molecular sieve type X is also effective in trapping higher molecular weight hydrocarbons such as oil molecules out of the ethane stream, thus keeping them from contaminating the type 5A molecular sieve adsorbent.

The process of this invention is particularly valuable where it is desired to separate straight chain hydrocarbons from non-straight chain hydrocarbons contained in a vaporized hydrocarbon mixture. Such separation may be effectively accomplished by passing the mixture over a sodium calcium alumino-silicate having a pore size of about 5 Angstrom units. A molecular sieve of this type is designated type A.

Where the hydrocarbon mixture is passed over the sieve, carbonaceous material tends to clog the sieve pores and after several cycles of adsorption and desorption, the adsorptive capacity of the sieve is diminished. By passing the hydrocarbon over activated alumina prior to desorption, the adsorptive capacity of the sieve will not be reduced by carbonaceaus material.

What is claimed is:

1. A method for separating hydrocarbon gas mixtures comprising the steps of contacting a hydrocarbon gas mixture with a first zeolitic molecular sieve material being a member selected from the group consisting of analcite, gmelinite, chabazite and zeolite A, and adsorbing a first component therein; discharging first component-depleted hydrocarbon gas from the first molecular sieve; thereafter providing a purge gas containing at least one component which would deleteriously effect the adsorptive characteristics of the first molecular sieve, and zeolite X molecular sieve material having a larger pore size than that possessed by said first molecular sieve; contacting said purge gas with the zeolite X and adsorbing the deleterious component therein; contacting the deleterious component-depleted purge gas with the first component-containing first molecular sieve thereby desorbing said first component; discharging the first component-containing purge gas from the first molecular sieve.

2. A method for separating hydrocarbon gas mixtures comprising the steps of contacting a hydrocarbon gas mixture with a first zeolitic molecular sieve material being a member selected from the group consisting of analcite, gmelinite, chabazite and zeolite A, and adsorbing a hydrocarbon therein; discharging hydrocarbon-depleted gas from the first molecular sieve; thereafter providing a purge gas containing at least one component which would deleteriously effect the adsorptive characteristics of the first molecular sieve, and zeolite X molecular sieve material having a larger pore size than that possessed by said first molecular sieve; contacting said purge gas with the zeolite X and adsorbing the deleterious component therein; contacting the deleterious component-depleted purge gas with the hydrocarbon-containing first molecular sieve thereby desorbing said hydrocarbon; discharging the hydrocarbon-containing purge gas from the first molecular sieve.

3. A method according to claim 2 in which zeolite A is said first molecular sieve.

4. A method according to claim 2 in which said hydrocarbon is propylene.

5. A method according to claim 2 in which said purge gas is butane.

6. A method according to claim 2 in which the deleterious component is a mercaptan compound.

7. A method according to claim 2 in which the deleterious component is water.

8. A method for separating hydrocarbon gas mixtures comprising the steps of contacting a hydrocarbon gas mixture with zeolite A material and adsorbing a hydrocarbon therein; discharging hydrocarbon-depleted gas from the zeolite A material; thereafter providing a purge gas containing water and mercaptan compounds, and zeolite X material; contacting said purge gas with said zeolite X material and adsorbing said water and mercaptan compounds therein; contacting the water and mercaptan compound-depleted purge gas with the hydrocarbon-containing zeolite A material thereby desorbing said hydrocarbon; discharging the hydrocarbon-containing purge gas from the zeolite A material.

9. A method according to claim 8 in which said hydrocarbon is propylene and said purge gas is butane.

References Cited in the file of this patent

UNITED STATES PATENTS

| | | |
|---|---|---|
| 2,818,137 | Richmond et al. | Dec. 31, 1957 |
| 2,866,835 | Kimberlin et al. | Dec. 30, 1958 |
| 2,899,474 | Richards | Aug. 11, 1959 |
| 2,920,038 | Feldbauer et al. | Jan. 5, 1960 |
| 2,921,026 | Fleck et al. | Jan. 12, 1960 |
| 2,924,630 | Fleck et al. | Feb. 9, 1960 |